United States Patent [19]

Nishikawa et al.

[11] Patent Number: 4,760,761

[45] Date of Patent: Aug. 2, 1988

[54] CONTROL SYSTEM FOR A DIRECT-COUPLING MECHANISM IN HYDRAULIC POWER TRANSMISSION MEANS OF A TRANSMISSION FOR AUTOMOTIVE VEHICLES

[75] Inventors: Masao Nishikawa, Nerima; Yoshimi Sakurai, Tanashi; Takashi Aoki, Fujimi, all of Japan

[73] Assignee: Honda Giken Kogyo K.K., Tokyo, Japan

[21] Appl. No.: 697,349

[22] Filed: Feb. 1, 1985

[30] Foreign Application Priority Data

Feb. 6, 1984 [JP] Japan ................................ 59-19792

[51] Int. Cl.⁴ ............................................ B60K 41/02
[52] U.S. Cl. ........................................ 74/867; 74/869; 74/731; 192/0.076; 192/3.31
[58] Field of Search ................. 74/854, 856, 866, 867, 74/868, 869, 731, 732, 733; 192/0.052, 3.51, 3.58, 3.31, 0.092, 0.076

[56] References Cited

U.S. PATENT DOCUMENTS

| | | | |
|---|---|---|---|
| 3,546,973 | 12/1970 | Ohie et al. | 74/868 |
| 3,859,873 | 1/1975 | Miyawchi et al. | 74/867 |
| 4,148,232 | 4/1979 | Moriya | 74/867 |
| 4,393,467 | 7/1983 | Miki et al. | 74/866 |
| 4,437,358 | 3/1984 | Kubo et al. | 74/867 |
| 4,441,385 | 4/1984 | Taga et al. | 74/867 |
| 4,449,618 | 5/1984 | Suga et al. | 74/866 |
| 4,457,410 | 7/1984 | Suga et al. | 74/866 |
| 4,516,671 | 5/1985 | Nishikawa et al. | 192/0.076 |
| 4,579,208 | 4/1986 | Nishikawa et al. | 192/0.052 |

Primary Examiner—Leslie A. Braun
Assistant Examiner—David Novais
Attorney, Agent, or Firm—Arthur L. Lessler

[57] ABSTRACT

In a transmission for an automotive vehicle, a control system is provided for controlling a direct-coupling mechanism for mechanically engaging input and output members of a hydraulic power transmission mechanism of the transmission. The control system includes a first sensor for detecting the value of a first parameter indicative of the engine load, and a control mechanism adapted to compare the value of the first parameter detected by the first sensor with a predetermined reference value for selectively engaging and disengaging the input and output members with and from each other through the direct-coupling mechanism. A second sensor detects the value of a second parameter indicative of the vehicle speed, and a reference value setting device sets the predetermined reference value to a value dependent on the value of the second parameter detected by the second sensor.

10 Claims, 7 Drawing Sheets

CONTROL SYSTEM FOR A DIRECT-COUPLING MECHANISM IN HYDRAULIC POWER TRANSMISSION MEANS OF A TRANSMISSION FOR AUTOMOTIVE VEHICLES

BACKGROUND OF THE INVENTION

This invention relates to a control system for a direct-coupling mechanism installed in a hydraulic power transmission means of an automotive transmission, and more particularly to a control system of this kind which is intended to curtail the fuel consumption, as well as reduce vibrations of the vehicle body and operating noise of the engine over the whole operating region of the vehicle from a low vehicle speed region to a high one.

In an automotive vehicle equipped with a hydraulic power transmission means as a transmission, such as a hydraulic torque converter and a hydraulic coupling (hereinafter merely called "the torque converter") in general, the torque converter can provide due to its torque amplifying function a required driving force and a smooth and easy driving feeling over the whole speed region of the vehicle, even with a small number of speed reduction gears provided in the transmission. However, slippage loss inherent in the torque converter can cause degradation in the effective consumption of fuel and an increase in the engine rotational speed by an amount corresponding to the slippage loss, the latter resulting in larger operating noise of the engine.

To avoid this disadvantage, a direct-coupling or locking-up mechanism has been developed and actually brought into use which is adapted to mechanically couple the input and output members of the torque converter together to allow mechanical transmission of all or part of the engine power to the vehicle when the hydraulic power transmission by the torque converter is not necessary, thereby reducing the slippage loss for improvement of the power transmission efficiency.

In order to make best use of the direct-coupling mechanism to improve the effective fuel consumption and reduce the operating noise of the engine, it has been desired to expand the vehicle speed region wherein the direct-coupling mechanism is operated (hereinafter called "the direct-coupling operating region") to a lower speed side.

Conventionally, it is a general practice to render the direct-coupling mechanism inoperative to interrupt the locking-up of the torque converter and resume the hydraulic power transmission by the torque converter when the accelerator pedal is suddenly returned toward its idle position, in order to avoid torque fluctuations and accordingly vibrations of the whole transmission system, which would otherwise be caused by suddenly releasing the accelerator pedal to give discomfort to the driver and passenger(s). To effectively avoid such unpleasant vibrations due to torque fluctuations, it is desirable to disengage the direct-coupling mechanism immediately after the accelerator pedal is released when the throttle valve opening has not yet decreased to a much smaller value. However, conventionally such disengagement of the direct-coupling mechanism is generally effected when the throttle valve opening is reduced below a certain value, regardless of the vehicle speed.

A problem is encountered when the direct-coupling operating region is expanded to a low/middle vehicle speed region for the aforementioned purposes. That is, the throttle valve opening required at cruising in such low/middle vehicle speed region wherein the direct-coupling mechanism should be operative is much smaller than at cruising in a high vehicle speed region, and accordingly the throttle valve opening at which the direct-coupling mechanism is to be disengaged has to be set at a very small value below the above valve opening at cruising in the low/middle vehicle speed region. If such very small valve opening value is applied as the direct-coupling interrupting value throughout a whole operating region from a low vehicle speed region to a high one as conventionally adopted, there can be a delay in the disengagement of the direct-coupling mechanism when the accelerator pedal is suddenly released during running of the vehicle at a high speed, causing unpleasant vehicle body vibrations.

SUMMARY OF THE INVENTION

It is the object of the invention to provide a control system for a direct-coupling mechanism of a hydraulic power transmission means in an automotive transmission, which is capable of eliminating vibrations of the vehicle body upon sudden release of the acceleration pedal so as to permit the mechanical coupling between the input and output members of the hydraulic power transmission means throughout the whole speed region of the vehicle, thereby avoiding discomfort to be caused by the vibrations of the vehicle body and improving the effective fuel consumption.

The present invention provides a control system for controlling a direct-coupling mechanism of a hydraulic power transmission means in a transmission for an automotive vehicle, the hydraulic power transmission means having an input member coupled to an internal combustion engine of the vehicle, an output member, and the direct-coupling mechanism arranged between the input and output members and operable to mechanically engage the input and output members with each other. The control system includes first sensor means for detecting the value of a first parameter indicative of load on the engine, and control means adapted to compare the value of the first parameter detected by the first sensor means with a predetermined reference value and cause the direct-coupling mechanism to selectively engage the input and output members with each other and disengage them from each other, depending upon the result of the comparison. The control system is characterized by including second sensor means for detecting the value of a second parameter indicative of the speed of the vehicle, and reference value setting means for setting the predetermined reference value to a value dependent on the value of the second parameter detected by the second sensor means.

Preferably, as the detected value of the second parameter indicative of the vehicle speed becomes larger, the predetermined reference value is set to a value indicative of a larger output of the engine, by the reference value setting means.

Also preferably, the control system includes an operating fluid source, while the direct-coupling mechanism has a hydraulically operating portion operable in response to operating fluid pressure from the operating fluid source to mechanically engage the input and output members with each other. The control means comprises a selector valve arranged in an operating fluid line connecting the hydraulically operating portion of the direct-coupling mechanism to the operating fluid source, for selectively permitting and interrupting the supply of the operating fluid pressure from the operating fluid source to the hydraulically operating portion.

Preferably, the selector valve includes a valve body shiftable to assume a first position and a second position for, respectively, permitting and interrupting the supply of the operating fluid pressure from the operating fluid source to the hydraulically operating portion. The first parameter comprises the valve opening of a throttle valve arranged in an intake system of the engine, and the first sensor means is adapted to generate a pilot fluid pressure corresponding to the detected valve opening of the throttle valve and supply same to the control means. The selector valve is disposed to have the valve body thereof shifted to the first position when the pilot fluid pressure supplied from the first sensor means exceeds the predetermined reference value. The second sensor means is adapted to generate a pilot fluid pressure proportional to the speed of the vehicle as the detected value of the second parameter and supply same to the reference value setting means. The reference value setting means is adapted to set the predetermined reference value to a value dependent on the pilot fluid pressure supplied from the second sensor means.

The above and other objects, features and advantages of the invention will be more apparent from the ensuing detailed description taken in conjunction with the accompanying drawings.

BRIEF DESCRIPTION OF THE DRAWINGS

FIG. 3 is a diagram showing the manner in which FIGS. 3A and 3B are interconnected.

DETAILED DESCRIPTION

The invention will now be described in detail with reference to the drawings illustrating embodiments thereof.

Figure 1:
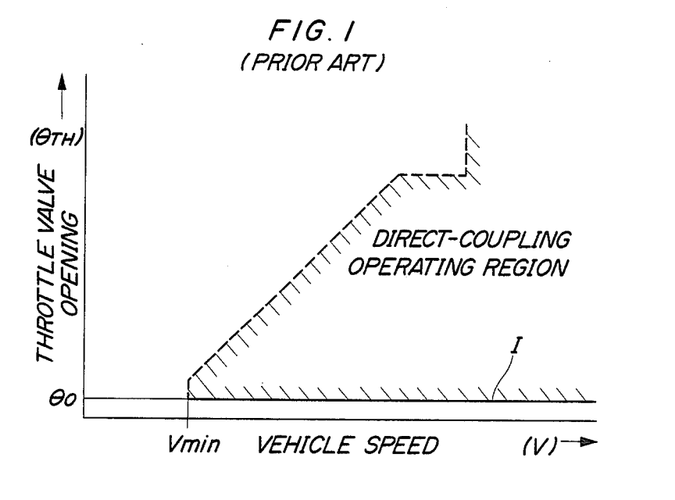
FIG. 1 is a graph showing an operable region of a direct-coupling mechanism, attained with a conventional control system.

Referring first to FIG. 1, there is illustrated a direct-coupling operating region of the torque converter wherein its direct-coupling mechanism is actuatable, which is achieved with a conventional control system for the direct-coupling mechanism. This conventional control system is adapted to interrupt the locking-up or direct-coupling of the torque converter when the valve opening $\theta TH$ of the throttle valve is smaller than a certain value $\theta 0$ indicated by the solid line I in FIG. 1 at deceleration of the engine, etc. The conventional control system is however merely adapted to interrupt the locking-up of the torque converter regardless of the vehicle speed V when the throttle valve opening $\theta TH$ is smaller than the certain value $\theta 0$.

If the throttle valve opening value $\theta TH$ for direct-coupling interruption is set at a value smaller than the certain value $\theta 0$ so as to expand the direct-coupling operating region to a low/middle vehicle speed region, i.e. to a vehicle speed Vmin in FIG. 1, vibrations can occur in the power transmission system when the accelerator pedal is suddenly released to give discomfort to the driver, etc.

By this reason, it was impossible with the conventional art to set the direct-coupling interrupting vehicle speed Vmin to a low/middle speed region without vibrations in the power transmission system, impeding required reduction of the slippage loss of the torque converter for improvement of the effective fuel consumption.

Figure 2:
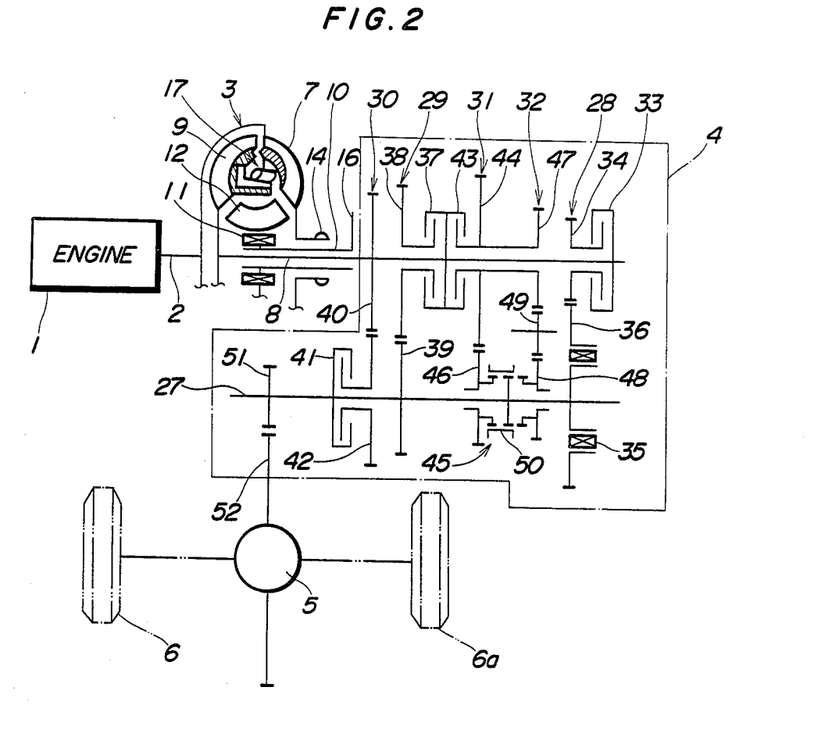
FIG. 2 is a schematic view of an automatic transmission for automotive vehicles, to which is applied the control system for a direct-coupling clutch according to the invention.

Referring next to FIG. 2, there is schematically illustrated an automatic transmission for automotive vehicles having four forward speed reduction gears and one reverse gear, to which the invention is applied. Output from an engine 1 is transmitted to driving wheels 6 and 6a for rotatively driving same through a crankshaft 2 of the engine, a hydraulic torque converter 3 serving as a hydraulic power transmission means, an auxiliary transmission 4, and a differential 5 in the mentioned order.

The hydraulic torque converter 3 comprises a pump 7 as an input member, coupled to the crankshaft 2, a turbine 9 as an output member, coupled to an input shaft 8 of the auxiliary transmission 4, and a stator 12 coupled via a one-way clutch 11 to a stator shaft 10 which in turn is supported on the input shaft 8 for rotation relative thereto. Torque is transmitted from the crankshaft 2 to the pump 7, and then to the turbine 9 in a hydrodynamic manner. When amplification of torque takes place while torque is transmitted from the pump 7 to the turbine 9, the resulting reaction force is borne by the stator 12, as is already known.

Figure 3:
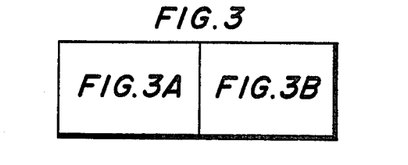
Figure 3A:
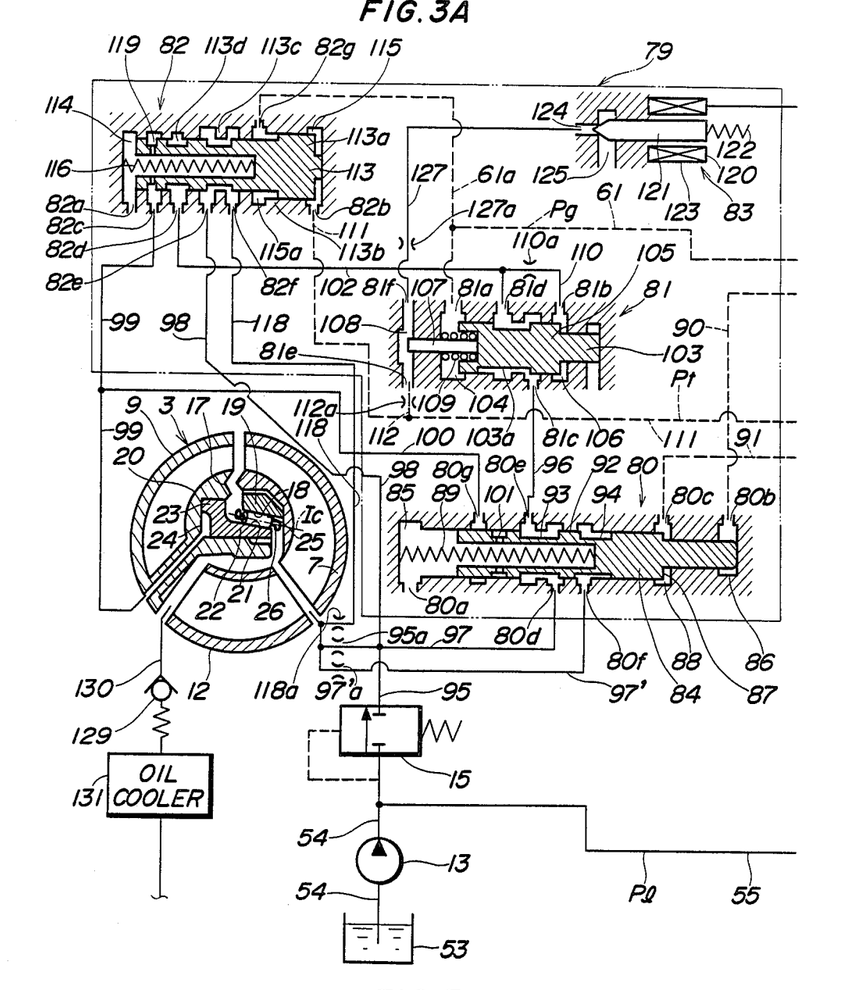
FIGS. 3A and FIGS. 3B constitute a circuit diagram illustrating a hydraulic control system employed in the automatic transmission shown in FIG. 2, in which is incorporated the direct-coupling clutch control system according to one embodiment of the invention.
Figure 3B:
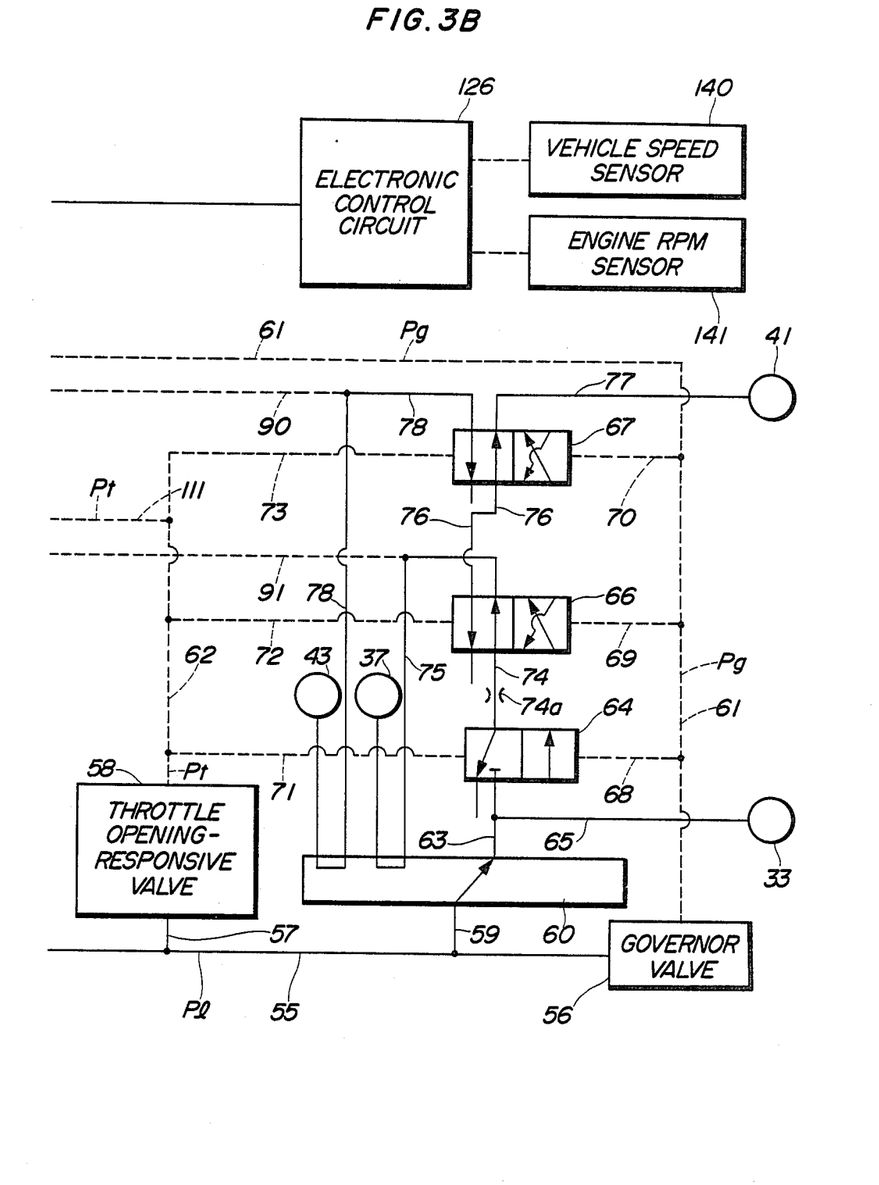

A pump driving gear 14 is arranged on a right end of the pump 7 remote from the crankshaft 2, for driving an oil hydraulic pump 13 appearing in FIG. 3. A stator arm 16 is secured to one end of the stator shaft 10 remote from the crankshaft 2, for controlling a regulator valve 15 appearing in FIG. 3.

A direct-coupling clutch 17 as a direct-coupling mechanism, which is a roller clutch type, is interposed between the pump 7 and the turbine 9 of the torque converter 3. The direct-coupling clutch 17 is adapted to establish mechanical coupling between the pump 7 and the turbine 9 when the torque amplifying function performed by the torque converter 3 is almost not available, and to interrupt the mechanical coupling when the torque amplifying function is available.

Figure 4:
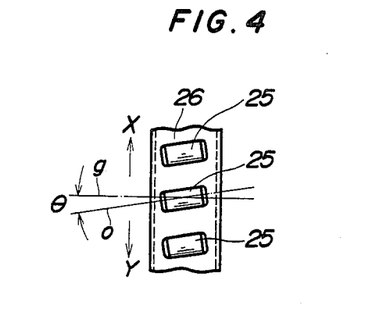
FIG. 4 is a development of essential part of the direct-coupling clutch appearing in FIG. 3.

Referring to FIGS. 3 and 4 showing in further detail the direct-coupling clutch 17, an annular driving member 19 having a driving conical surface 18 at its inner periphery is spline-fitted in an inner peripheral wall of the pump 7, whereas an annular driven member 22, which has a driven conical surface 21 at its outer periphery extending parallel with the driving conical surface 18, is slidably spline-fitted in an inner peripheral wall 20 of the turbine 9 for axial movement relative thereto. The driven member 22 has its one end formed integrally with a piston 23 slidably received within an oil hydraulic cylinder 24 formed in the inner peripheral wall 20 of the turbine 9. The piston 23 receives a pressure in the cylinder 24 and a pressure in the torque converter 3 at the same time, respectively, at its both or left and right end faces.

Cylindrical clutch rollers 25 are interposed between the driving and driven conical surfaces 18, 21 and retained in place by an annular retainer 26 in a manner such that, as shown in FIG. 4, the clutch rollers 25 each have its axis o inclined by a predetermined angle $\theta$ relative to the generating line g of a virtual conical surface Ic, shown in FIG. 3, which extends between the conical surfaces 18, 21 along the middle thereof.

When the torque converter 3 is not required to amplify the torque transmitted thereto, an oil pressure which is higher than the internal pressure of the torque converter 3 is supplied to the cylinder 24 to cause the piston 23, i.e. the driven member 22, to move toward the driving member 19, whereby the clutch rollers 25 are urgedly held between the conical surfaces 18, 21. With the clutch rollers 25 thus urgedly held between the conical surfaces 18, 21, if output torque from the engine 1 causes rotation of the driving member 19 in the direction indicated by the arrow X in FIG. 4 relative to the driven member 22, the clutch rollers 25 rotate about their own axes to provide relative axial displacement of the members 19, 22 in a direction such that the members 19, 22 approach toward each other, since the axis o of each clutch roller 25 is inclined relative to the generating line g, as hereinbefore described. Consequently, the clutch rollers 25 bitingly engage with the conical surfaces 18, 21 to establish mechanical coupling between the members 19, 22, i.e. the pump 7 and the turbine 9 of the torque converter 3. Even on this occasion, if engine output torque exceeding the coupling force of the direct-coupling clutch 17 is applied between the pump 7 and the turbine 9, the clutch rollers 25 can slip on the conical surfaces 18, 21 to divide the engine output torque into two parts, wherein part of the torque is mechanically transmitted through the direct-coupling clutch 17 while the remaining torque is hydrodynamically transmitted from the pump 7 to the turbine 9. Therefore, the ratio between the mechanically transmitted torque and the hydrodynamically transmitted torque is variable dependent upon the degree of slippage of the clutch rollers 25.

On the other hand, if a reverse load is applied to the torque converter 3 during operation of the direct-coupling clutch 17, the rotational speed of the driven member 22 becomes larger than that of the driving member 19, that is, the driving member 19 rotates in the direction indicated by the arrow Y in FIG. 4 relative to the driven member 22. Consequently, the clutch rollers 25 rotate in a direction reverse to that mentioned above, to cause relative axial displacement of the members 19, 22 in a direction of moving the same members 19, 22 away from each other. Thus, the clutch rollers 25 are released from biting engagement with the conical surfaces 18, 21 to run idle so that the reverse load is transmitted from the turbine 9 to the pump 7 only in a hydrodynamic manner.

As the oil hydraulic cylinder 24 is released from the oil pressure, the piston 23 is displaced to its initial position by the internal pressure of the torque converter 3 acting thereupon, thereby rendering the direct-coupling clutch 17 inoperative or uncoupled.

Referring again to FIG. 2, the auxiliary transmission 4 has an output shaft 27 extending parallel with the input shaft 8, and is provided with a first-speed gear train 28, a second-speed gear train 29, a third-speed gear train 30, a fourth-speed gear train 31, and a reverse gear train 32, all arranged in juxtaposition between the input and output shafts 8, 27. The first-speed gear train 28 comprises a first driving gear 34 connectible to the input shaft 8 through a first-speed clutch 33, and a first driven gear 36 connectible to the output shaft 27 through a one-way clutch 35 and engaging with the first driving gear 34. The second-speed gear train 29 comprises a second driving gear 38 connectible to the input shaft 8 through a second-speed clutch 37, and a second driven gear 39 secured to the output shaft 27 and engaging with the second driving gear 38, while the third-speed gear train 30 comprises a third driving gear 40 secured to the input shaft 8, and a third driven gear 42 connectible to the output shaft 27 through a third-speed clutch 41 and engaging with the third driving gear 40. The fourth-speed gear train 31 comprises a fourth driving gear 44 connectible to the input shaft 8 through a fourth-speed clutch 43, and a fourth driven gear 46 connectible to the output shaft 27 through a selector clutch 45 and engaging with the fourth driving gear 44. On the other hand, the reverse gear train 32 comprises a fifth driving gear 47 formed integrally with the fourth driving gear 44 of the fourth-speed gear train 31, a fifth driven gear 48 connectible to the output shaft 27 through the selector clutch 45, and an idle gear 49 engaging with the gears 47, 48. The selector clutch 45 is arranged between the fourth and fifth driven gears 46 and 48, and has a selector sleeve 50 which is shiftable between a left or forward position and a right or reverse position as viewed in FIG. 2, to selectively connect the driven gear 46 or 48 to the output shaft 27. The one-way clutch 35 permits the driving torque from the engine 1 alone to be transmitted to the driving wheels 6, 6a, while prohibiting transmission of torque from the driving wheels 6, 6a to the engine 1.

If the first-speed clutch 33 alone is engaged while the selector sleeve 50 is held in the forward position as illustrated in FIG. 2, the first driving gear 34 is connected to the input shaft 8 to establish the first-speed gear train 28, thereby allowing transmission of torque from the input shaft 8 to the output shaft 27 therethrough. Then, if the second-speed clutch 37 is engaged with the first-speed clutch 33 maintained in its engaged state, the second driving gear 38 is connected to the input shaft 8 to establish the second-speed gear train 29 through which torque can be transmitted from the input shaft 8 to the output shaft 27. That is, even while the first-speed clutch 33 is engaged, the second-speed gear train 29, the third-speed gear train 30 or the fourth-speed gear train 31 can be established by the action of the one-way clutch 35, rendering the first-speed gear train 28 substantially inoperative. If the second-speed clutch 37 is disengaged and the third-speed clutch 41 is engaged instead, the third driven gear 42 is connected to the output shaft 27 to establish the third-speed gear train 30, while if the third-speed clutch 41 is disengaged and the fourth-speed clutch 43 is engaged instead, the fourth driving gear 44 is connected to the input shaft 8 to thereby establish the fourth-speed gear train 31. On the other hand, if the fourth-speed clutch 43 alone is engaged while the selector sleeve 50 of the selector clutch 45 is shifted to the right or reverse position, the fifth driving gear 47 and the fifth driven gear 48 are connected, respectively, to the input shaft 8 and the output shaft 27 to establish the reverse gear train 32, thereby allowing transmission of torque from the input shaft 8 to the output shaft 27 through the reverse gear train 32.

The torque transmitted to the output shaft 27 is then transmitted through an output gear 51 mounted on one end of the output shaft 27 to an enlarged gear 52 of the differential 5.

Referring now to FIG. 3, the oil hydraulic pump 13 is arranged in a first fluid line 54 connecting the inlet of the regulator valve 15 to an oil tank 53, and sucks oil from the oil tank 53 for pressure delivery of same to a second fluid line 55. The pressurized oil from the pump 13 has its pressure regulated to a predetermined value (hereinafter called "the line pressure Pl") by the regulator valve 15. The second fluid line 55 connects the first fluid line 54 to the inlet of a governor valve 56. A third fluid line 57 branches off from the second fluid line 55 and is connected to the inlet of a throttle opening-responsive valve 58, while a fourth fluid line 59 branches off from the second fluid line 55 at a location between the junction thereof with the third fluid line 57 and the governor valve 56, and is connected to the inlet of a manual shift valve 60 whose position is manually selectable.

The governor valve 56 as means for outputting a parameter signal representative of the vehicle speed is rotatively driven by the output shaft 27 of the auxiliary transmission 4 or the enlarged gear 52 of the differential 5, to generate an oil pressure variable in response to the vehicle speed, i.e. the governor pressure Pg, and supply same to a first pilot fluid line 61.

The throttle opening-responsive valve 58 as means for outputting a parameter signal representative of load on the engine generates an oil pressure (throttle pressure Pt) corresponding to the stepping amount of an accelerator pedal, not shown, of the engine 1, that is, corresponding to the valve opening of a throttle valve (not shown) arranged in the intake system of the engine 1, and supplies same to a second pilot fluid line 62.

The manual shift valve 60 is shiftable between a neutral position, a drive range position and a reverse position, and disposed to connect the fourth fluid line 59 to a fifth fluid line 63 when it assumes the drive range position. The fifth fluid line 63 connects an outlet of the manual shift valve 60 to the inlet of a first shift valve 64, while a hydraulically operating portion of the first-speed clutch 33 is connected to the fifth fluid line 63 via a sixth fluid line 65 branching off therefrom. Therefore, when the manual shift valve 60 is in the drive range position, the first-speed clutch 33 is always maintained in an engaged state. The operating oil pressure in the fifth fluid line 63 is supplied not only to the hydraulically operating portion of the first-speed clutch 33, but also to hydraulically operating portions of the second-speed, third-speed and fourth-speed clutches 37, 41 and 43 in a selective manner depending upon the switching actions performed by the first, second and third shift valves 64, 66 and 67, as hereinafter described.

The first to third shift valves 64, 66 and 67 have their one ends acted upon by the governor pressure Pg supplied through third, fourth and fifth pilot fluid lines 68, 69 and 70, respectively, all branching off from the first pilot fluid line 61, and their other ends acted upon by the combined force of a spring, not shown, and the throttle pressure Pt supplied, respectively, through sixth, seventh and eighth pilot fluid lines 71, 72 and 73 branching off from the second pilot fluid line 62. These shift valves 64, 66 and 67 are each adapted to shift from a left or first position to a right or second position when the governor pressure Pg exceeds the combined force of the throttle pressure Pt and the spring with an increase in the the governor pressure Pg, i.e. an increase in the vehicle speed. The forces of the springs of the shift valves 64–67 are set to respective different values. To be specific, the first shift valve 64, which is arranged between the fifth fluid line 63 and a seventh fluid line 74 provided with a restriction 74a, is adapted to assume the left or first position when the vehicle speed is low, to thereby disconnect the fluid lines 63, 74 from each other. With the first shift valve 64 held in this position, the first-speed clutch 33 alone is engaged to establish the first-speed reduction ratio.

As the vehicle speed increases, the first shift valve 64 shifts to the right or second position to communicate the fifth fluid line 63 with the seventh fluid line 74. On this occasion, the second shift valve 66 is in the first position as illustrated, to communicate the seventh fluid line 74 with an eighth fluid line 75 connected to the hydraulically operating portion of the second-speed clutch 37. Although, both the first-speed and second-speed clutches 33, 37 are thus engaged, the second-speed gear train 29 alone is established by the action of the one-way clutch 35 in FIG. 2 to provide the second-speed reduction ratio.

When the vehicle speed further increases, the second shift valve 66 is shifted to the right or second position to communicate the seventh fluid line 74 with a ninth fluid line 76 connecting the second and third shift valves 66, 67 with each other. On this occasion, the third shift valve 67 still assumes the left or first position as illustrated, to communicate the ninth fluid line 76 with a tenth fluid line 77 connected to the hydraulically operating portion of the third-speed clutch 41, whereby the third-speed clutch 41 becomes engaged to establish the third-speed reduction ratio.

The third shift valve 67 is shifted to the right or second position with a further increase in the vehicle speed, and the ninth fluid line 76 is communicated with an eleventh fluid line 78 connected to the hydraulically operating portion of the fourth-speed clutch 43 so that the fourth-speed clutch 43 becomes engaged to establish the fourth-speed reduction ratio.

A control device 79 for controlling the operating oil pressure to be applied to the direct-coupling clutch 17 comprises a timing valve 80 for interrupting the locking-up of the torque converter 3 in synchronism with gear shifting operation, a modulator valve 81, an idle release valve 82, and a pressure adjusting means 83 for finely adjusting the operating oil pressure to be applied to the direct-coupling clutch 17.

The pressurized oil which has been regulated to the predetermined pressure value by the regulator valve 15 is delivered in part to the torque converter 3 through a twelfth fluid line 95 provided with a restriction 95a, to increase the internal pressure of the torque converter 3 for prevention of cavitation therein, while another part of the regulated pressurized oil is supplied to the timing valve 80 through a fourteenth fluid line 97 branching off from the twelfth fluid line 95.

The timing valve 80 operates to temporarily interrupt the engagement of the direct-coupling clutch 17, i.e. the locking-up of the torque converter 3, at changeover of the speed reduction ratio by the auxiliary transmission 4, and comprises a spool valve body 84, a first pilot pressure chamber 85 defined in part by a left end face of the valve body 84, a second pilot pressure chamber 86 defined in part by a right end face of the valve body 84, a third pilot pressure chamber 88 defined in part by a stepped shoulder 87 formed on the right end portion of the valve body 84, and a spring 89 urging the valve body 84 toward a first position, i.e. toward the second pilot pressure chamber 86. A first port 80a opening into the first pilot pressure chamber 85 communicates with the oil tank 53 through a pipe, not shown, while a second port 80b opening into the second pilot pressure chamber 86 communicates with a ninth pilot fluid line 90 which branches off from the eleventh fluid line 78 connected to the hydraulically operating portion of the fourth-speed clutch 43. A third port 80c opening into the third pilot pressure chamber 88 communicates with a tenth pilot fluid line 91 which branches off from the eighth fluid line 75 connected to the hydraulically operating portion of the second-speed clutch 37. The pressure-receiving surface of the valve body 84 facing the second pilot pressure chamber 86, i.e. the right end face of the valve body 84, has an area substantially equal to the surface area of the stepped shoulder 87 of the same valve body 84 facing the third pilot pressure chamber 88. An axially intermediate portion of the valve body 84 has its outer peripheral surface formed with two annular grooves 93 and 94 with a land 92 interposed therebetween. When the first-speed reduction ratio or the third-speed reduction ratio is established, the valve body 84 assumes a right or first position as illustrated. With the valve body 84 thus held in the first position, the fourteenth fluid line 97 is communicated with the thirteenth fluid line 96 connected to the modulator valve 81 through fourth and fifth ports 80d and 80e then facing the annular groove 93. Also when the valve body 84 is in the left or second position while the second-speed or fourth-speed reduction ratio is established, the fourteenth fluid line 97 is communicated with the thirteenth fluid line 96, but now through the fourth port 80d, the annular groove 94 and the fifth port 80e. On the other hand, when the valve body 84 passes an intermediate position between the first and second positions, the thirteenth and fourteenth fluid lines 96, 97 are temporarily disconnected from each other by the land 92, and the fourteenth fluid line 97 is in turn connected to a fluid line 97′ provided with a restriction 97′a and communicating with the interior of the torque converter 3, through the fourth port 80d, the annular groove 94, and a sixth port 80f arranged between the fourth and third ports 80d, 80c, to thereby increase the internal pressure of the torque converter 3 for facilitating the disengagement of the direct-coupling clutch 17 at gear shifting operation. A seventh port 80g is arranged between the first port 80a and the fifth port 80e, and communicates with a seventeenth fluid line 100 which branches off from a sixteenth fluid line 99 connected to the oil hydraulic cylinder 24 of the direct-coupling clutch 17. When the valve body 84 passes the intermediate position in shifting from the first position to the second positions, the seventeenth fluid line 100 becomes communicated with the oil tank 53 through a port 101 formed in the valve body 84, the first pilot pressure chamber 85, and the first port 80a. Therefore, when the valve body 84 shifts from the first position to the second position, the engagement of the direct-coupling clutch 17 is temporarily interrupted so that the torque converter 3 can hydromechanically absorb shocks caused by gear shifting.

The modulator valve 81 is arranged between the thirteenth fluid line 96 and an eighteenth fluid line 102, and comprises a spool valve body 103, a first pilot pressure chamber 104 defined in part by a left end face of the valve body 103, a second pilot pressure chamber 106 defined in part by a stepped shoulder 105 formed on the right end portion of the valve body 103, a plunger 107 having its right end portion projected into the first pilot pressure chamber 104 and disposed for urging contact with the valve body 103, a third pilot pressure chamber 108 defined in part by a left end face of the plunger 107, and a spring 109 accommodated within the first pilot pressure chamber 104 and urging the valve body 103 toward a first position, i.e. toward the second pilot pressure chamber 106. A first port 81a opening into the first pilot pressure chamber 104 communicates with the first pilot fluid line 61 which delivers the governor pressure Pg, through a ninth pilot fluid line 61a branching off therefrom, whereby the first pilot pressure chamber 104 is supplied with the governor pressure Pg. A second port 81b opening into the second pilot pressure chamber 106 communicates with the eighteenth fluid line 102 through a nineteenth fluid line 110 provided with a restriction 110a, while a third port 81c is arranged between the first and second ports 81a, 81b, and communicates with the thirteenth fluid line 96.

A fourth port 81d is arranged between the first and third ports 81a, 81c and communicates with the eighteenth fluid line 102, while a fifth port 81e opening into the third pilot pressure chamber 108 communicates with a tenth pilot fluid line 111 branching off from the second pilot fluid line 62 which delivers the throttle pressure Pt from the throttle opening-responsive valve 58, through an eleventh pilot fluid line 112 provided with a restriction 112a branching off from the tenth pilot fluid line 111. A sixth port 81f opening into the third pilot pressure chamber 108 at a location opposite the fifth port 81e is connected to the pressure adjusting means 83 via a drain line 127 provided with a restriction 127a.

With the above described construction of the modulator valve 81, the spool valve body 103 is urged toward the right or first position by the combined force of the throttle pressure Pt, the governor pressure Pg and the spring 109, so as to communicate the third and fourth ports 81c, 81d with each other through an annular groove 103a formed on the valve body 103. At the same time, the valve body 103 is urged toward a left or second position by the output oil pressure of the modulator valve 81 per se, so as to interrupt the communication between the third and fourth ports 81c, 81d. That is, the modulator valve 81 operates to increase the oil pressure to be outputted to the eighteenth fluid line 102, i.e. the operating oil pressure for the direct-coupling clutch 17, in proportion to an increase in the vehicle speed and/or an increase in the throttle valve opening.

The idle release valve 82 serves as control means for selectively holding the direct-coupling clutch 17 in an operative state or in an inoperative state and is formed of a spool-type selector valve. The idle release valve 82 is arranged between the eighteenth fluid line 102 and the sixteenth fluid line 99 communicating with the oil hydraulic cylinder 24 of the direct-coupling clutch 17, and comprises a spool valve body 113, a first pilot pressure chamber 114 defined in part by a left end face of the valve body 113, a second pilot pressure chamber 115 defined in part by a first stepped shoulder 113a formed on the right end portion of the valve body 113, a third pilot pressure chamber 115a defined in part by a second stepped shoulder 113b formed on the valve body 113, and a spring 116 urging the valve body 113 toward a first position thereof, i.e. toward the second pilot pressure chamber 115. A first port 82a opening into the first pilot pressure chamber 114 communicates with the oil tank 53 through a pipe, not shown, while a second port 82b opening into the second pilot pressure chamber 115 is connected to the tenth pilot fluid line 111 which delivers the throttle pressure Pt. A third port 82c is arranged adjacent the first port 82a and connected to the sixteenth fluid line 99 communicating with the oil hydraulic cylinder 24 of the direct-coupling clutch 17, and a fourth port 82d arranged between the second and third ports 82b, 82c is connected to the eighteenth fluid line 102. A fifth port 82e is arranged between the second and fourth ports 82b, 82d and connected to the fifteenth fluid line 98 branching off from the twelfth fluid line 95, while a sixth port 82f is arranged between the second and fifth ports 82b, 82e in communication with the interior of the torque converter 3 through a nineteenth fluid line 118 provided with a restriction 118a. When the valve body 113 is in the right or first position, the first and third ports 82a, 82c communicate with each other through a through hole 119 formed in the valve body 113. A seventh port 82g is arranged between the second and sixth ports 82b, 82f opens into the third pilot pressure chamber 115a while it is connected to the ninth pilot fluid line 61a.

With the above described construction of the idle release valve 82, when the oil pressure in the second pilot pressure chamber 115, i.e. the throttle pressure Pt, is smaller than the combined force of the spring 116 and the governor pressure Pg introduced therethrough the seventh port 82g, acting upon the valve body 113 rightward as viewed in FIG. 3, the valve body 113 assumes the first position as illustrated and accordingly the operating oil in the oil hydraulic cylinder 24 of the direct-coupling clutch 17 is drained to the oil tank 53 through the sixteenth fluid line 99, the third port 82c, the through hole 119 in the valve body 113, the first pilot pressure chamber 114, and the first port 82a. On this occasion, the fifteenth and nineteenth fluid lines 98, 118 are communicated with each other through the fifth port 82e, a first annular groove 113c formed on the valve body 113, and the sixth port 82f, to thus maintain direct-coupling clutch 17 in an inoperative state. On the other hand, when the throttle pressure Pt introduced into the second pilot pressure chamber 115 exceeds the combined force of the spring 116 and the governor pressure Pg, the valve body 113 moves toward a left or second position thereof to communicate the sixteenth and eighteenth fluid lines 99, 102 with each other through the third port 82c, a second annular groove 113d formed on the valve body 113, and the fourth port 82d, whereby the direct-coupling clutch 17 is operated. In this manner, the idle release valve 82 operates to interrupt the engagement of the direct-coupling clutch 17, i.e. the locking-up of the torque converter 3, when the throttle valve shows an idle opening.

The pressure adjusting means 83 is formed of an electromagnetic poppet valve 120 and comprises a valve body 121, a spring 122 urging the valve body 121 toward a left or closed position thereof, a solenoid 123 energizable to urge the valve body 121 toward a right or open position against the urging force of the spring 122, and inlet and outlet ports 124 and 125 disposed to be selectively connected with and disconnected from each other by the valve body 121. The inlet port 124 is connected to the drain line 127, while the outlet port 125 communicates with the oil tank 53 through a pipe, not shown.

The electromagnetic poppet valve 120 has its solenoid 123 electrically connected to an electronic control circuit 126, to which are also electrically connected a vehicle speed sensor 140 which detects the rotational speed of the output shaft 27 of the auxiliary transmission 4 or that of another alternative rotary shaft disposed to rotate in unison with the output shaft 27 with a constant speed ratio thereto, for generating an electrical signal representative of the vehicle speed, and an engine speed sensor 141 which detects the rotational speed of the engine for generating an electrical signal representative of the engine speed. The electronic control circuit 126 is responsive to the signals supplied from the sensors 140, 141, to calculate the speed ratio e between the pump 7 as the input member and the turbine 9 as the output member of the torque converter 3, and energize the solenoid 123 to displace the valve body 121 toward the open position when the speed ratio e becomes close to 1 above a reference value in a particular vehicle speed region, whereby the throttle pressure Pt acting upon the modulator valve 81 is decreased to reduce the engaging force of the direct-coupling clutch 17.

When the speed ratio e of 1 means that the input and output members of the torque converter 3 are completely coupled with each other for rotation in unison with each other with no slippage occurring therebetween, frequently causing uncomfortable vibrations and noise of the vehicle body in the particular vehicle speed region. To effectively avoid such vibrations and noise of the vehicle body the solenoid 123 is energized when the speed ratio e is close to 1 as stated above, to reduce the engaging force of the direct-coupling clutch 17 so as to permit slippage between the input and output members.

Incidentally, reference numeral 129 appearing in FIG. 3 denotes a check valve arranged in an outlet fluid line 130 extending from the torque converter 3. The oil passing through the check valve 129 is returned to the oil tank 53 through an oil cooler 131.

The control system 79 for the direct-coupling clutch 17, constructed as above, operates as follows: When the accelerator pedal is in an idle position, the throttle pressure Pt to be applied to the second pilot pressure chamber 115 of the idle release valve 82 is substantially zero. Accordingly, the valve body 113 is held in the first position as illustrated, by the combined force of the spring 116 and the governor pressure Pg as stated before, to disconnect the eighteenth and sixteenth fluid lines 102, 99 from each other and simultaneously allow the operating oil in the oil hydraulic cylinder 24 of the direct-coupling clutch 17 to be drained to the oil tank 53 through the sixteenth fluid line 99 and the first port 82a. Thus, the direct-coupling clutch 17 remains inoperative to hold the torque converter 3 in a locked-up state.

When the spool valve body 113 of the idle release valve 82 is in the first position, the operating oil delivered from the regulator valve 15 is introduced in part into the interior of the torque converter 3 through the fifteenth fluid line 98, the fourth port 82e, the fifth port 82f and the nineteenth fluid line 118, to increase the internal pressure of the torque converter 3, thereby further facilitating the interruption of engagement of the direct-coupling clutch 17.

If the accelerator pedal is stepped on with the idle release valve 82 held in the first position, the throttle pressure Pt increases in proportion to the stepping amount of the accelerator pedal, which is then applied to the second pilot pressure chamber 115 of the idle release valve 82. When the throttle pressure Pt in the chamber 115 exceeds the combined force of the spring 116 and the governor pressure Pg, the spool valve body 113 is moved toward the left or second position to close the through hole 119 of the spool valve body 113 and thereby interrupt the communication between the fifth and sixth ports 82e, 82f, while simultaneously establishing the communication between the eighteenth and sixteenth fluid lines 102, 99. Accordingly, the increased oil pressure acts upon the oil hydraulic cylinder 24 of the direct-coupling clutch 17 to cause the clutch to engage and thereby lock up the torque converter 3.

Figure 5:
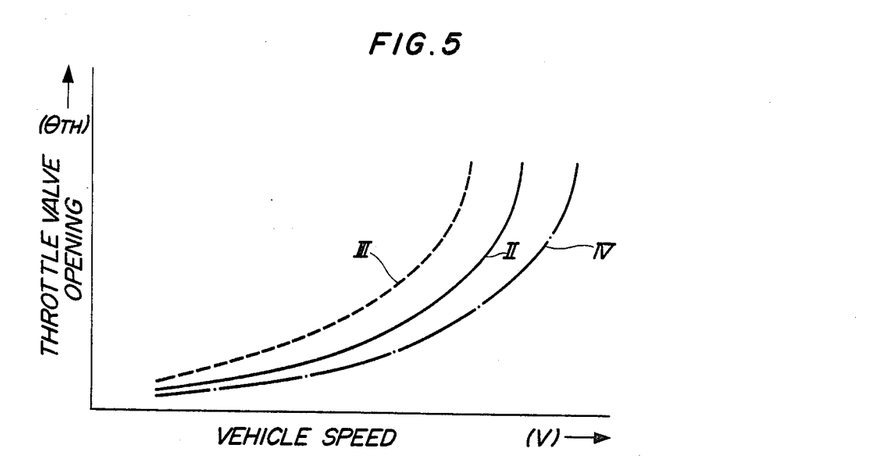
FIG. 5 is a graph showing various operating lines of the engine at cruising, defined by the vehicle speed V and the throttle valve opening $\theta$.

As noted above, the valve body 113 of the idle release valve 82 is urged toward the first position where the direct-coupling clutch 17 is not operated, by the spring 116 and the governor pressure Pg, and at the same time urged toward the second position where the clutch 17 is operated, by the throttle pressure Pt. The governor pressure Pg and the throttle pressure Pt are, respectively, proportional to the vehicle speed and to the throttle valve opening, as stated hereinbefore. The present invention is therefore based on the recognition that the throttle valve opening ($\theta$TH) assumed during cruising increases with an increase in the vehicle speed (V) as indicated by the solid line II in FIG. 5. In the figure, the broken line III indicates the throttle valve opening assumed when the vehicle cruises while running up a slope with constant inclination, that is, when a high load is applied on the engine, while the one-dot chain line IV indicates the throttle valve opening assumed when the vehicle cruises while running down the same slope, that is, when a small load is applied on the engine.

Therefore, the larger the governor pressure Pg acting upon the second stepped shoulder 113b of the idle release valve 82, the larger stepping amount of the accelerator pedal is required to generate a still higher throttle pressure Pt exceeding the governor pressure Pg. Otherwise the valve body 113 of the idle release valve 82 cannot be shifted to the second position where the direct-coupling clutch 17 is operated.

Figure 6:
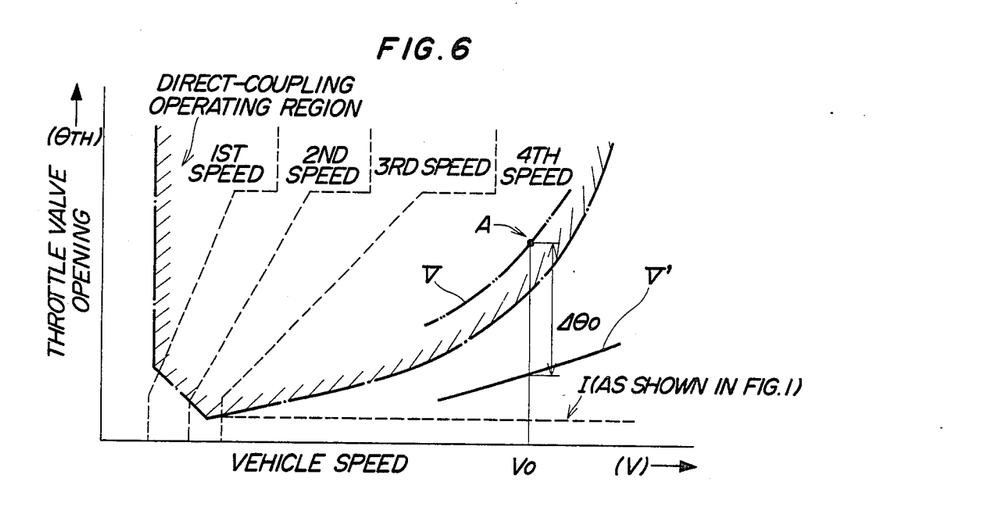
FIG. 6 is a graph showing an operable region of the direct-coupling mechanism, attained with the control system according to the invention.

This will be described in further detail with reference to FIG. 6. Let it be assumed that the accelerator pedal is returned while the vehicle is running at a speed V0 (the point A in FIG. 6) to avoid getting closer to a vehicle running immediately ahead, so that the throttle valve opening $\theta$TH is reduced by an amount $\Delta\theta$0 to a value lying on an operating line V' outside the direct-coupling operating region, indicated by the solid line in FIG. 6 from an operating line V indicated by the two-dot chain line. Then the mechanical engagement of the direct-coupling clutch 17 is immediately interrupted to reduce vibrations of the power system comprised of the engine and the transmission, thereby avoiding discomfort to be caused by the vibrations.

Figure 7:
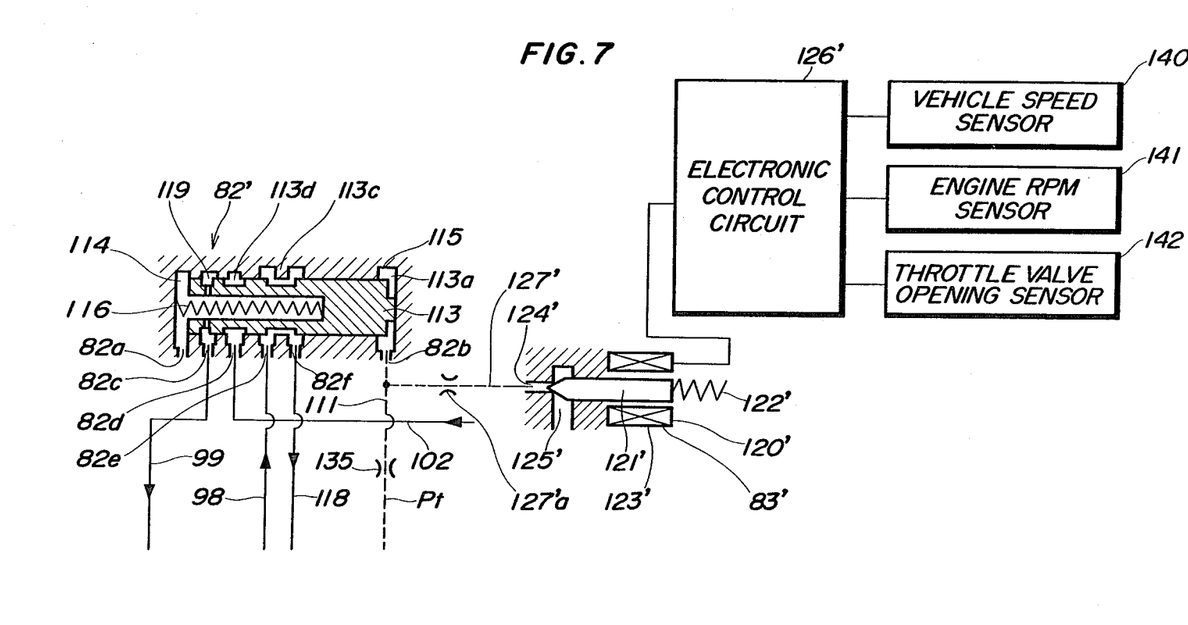
FIG. 7 is a circuit diagram illustrating a hydraulic control system according to a second embodiment of the invention but showing only modified essential part of the system of FIG. 3.

FIG. 7 illustrates an idle release valve 82' and its peripheral parts according to a second embodiment of the invention, wherein parts and elements other than those shown in FIG. 7 may be substantially identical with those in FIG. 3. In FIG. 7 like reference characters designate corresponding parts and elements having substantially the same functions in FIG. 3, for the convenience of explanation.

The idle release valve 82' according to the second embodiment has no stepped shoulder formed on its valve body 113, which corresponds to the second stepped shoulder 113b in FIG. 3 to which the governor pressure Pg is to be applied, as distinct from the first embodiment shown in FIG. 3. Instead of the second stepped shoulder 113b, a drain line 127' is connected to the tenth pilot fluid line 111. The drain line 127' is provided with a restriction 127'a and connected to a pressure adjusting means 83', which are similar to those 127a, 83 arranged in the drain line 127 in FIG. 3. Further, a restriction 135 is arranged in the tenth pilot fluid line 111 at a location upstream of the junction thereof with the drain line 127'.

The pressure adjusting means 83' is formed of an electromagnetic poppet valve 120' similar to the poppet valve 120 in FIG. 3, which comprises a valve body 121', a spring 122' urging the valve body 121' toward a closed position thereof, a solenoid 123' energizable to urge the valve body 121' toward an open position thereof against the urging force of the spring 122', and inlet and outlet ports 124' and 125' disposed to be selectively connected with and disconnected from each other by the valve body 121'. The inlet port 124' is connected to the drain line 127', while the outlet port 125' communicates with the oil tank 53 through a pipe, not shown.

The solenoid 123' of the electromagnetic poppet valve 120' is electrically connected to an electronic control circuit 126' to which are also electrically connected the vehicle speed sensor 140 and the engine rotational speed sensor 141, as well as a throttle valve opening sensor 142 which detects the valve opening of the throttle valve for generating an electrical signal indicative of the detected valve opening.

Figure 8:
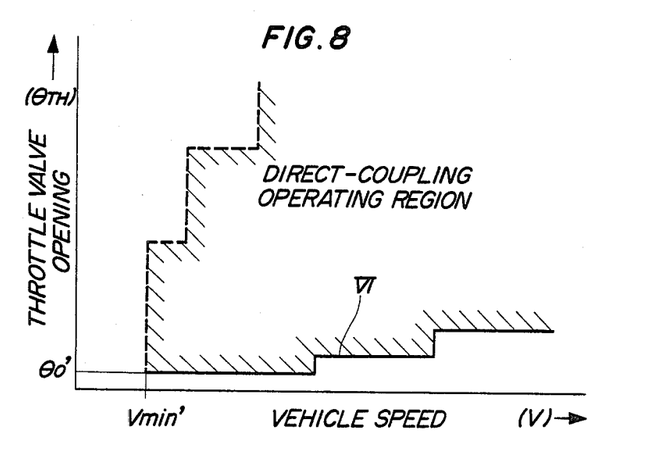
FIG. 8 is a graph showing an operable region of the direct-coupling mechanism, attained with the control system according to the second embodiment of the invention shown in FIG. 7.

The electronic control circuit 126' stores beforehand a plurality of predetermined reference values of the throttle valve opening $\theta$TH as indicated by the solid line VI in FIG. 8, of which larger values are selected with an increase in the vehicle speed V. The electronic control circuit 126' compares the value of the throttle valve opening signal supplied from the throttle valve opening sensor 142 with one of the predetermined reference values read in response to the value of the vehicle speed signal supplied from the vehicle speed sensor 140, and then energizes or deenergizes the solenoid 123' of the poppet valve 120' depending upon the result of the comparison. That is, when the throttle valve opening $\theta$TH decreases below the solid line VI in FIG. 8 defining the lower limit of the direct-coupling operating region, i.e. the predetermined reference value, the solenoid 123' is energized so that the drain line 127' is opened to reduce the throttle pressure Pt in the second pilot pressure chamber 115 of the idle release valve 82' below the minimum reference value $\theta$' in FIG. 8, thereby causing the valve body 113 to be shifted to a right or first position by the force of the spring 116. Therefore, by merely setting the force of the spring 116 at such a value that the valve body 113 of the idle release valve 82' is shifted to the first position when the throttle valve opening shows the minimum reference value $\theta$', the direct-coupling clutch 17 can be rendered inoperative at any values of the throttle valve opening below the other higher reference values corresponding to higher vehicle speed values V as well as below the minimum one $\theta$0'.

Although the foregoing embodiments are applied to an automatic transmission which has four forward speed reduction gears, the invention is not limited to this type but may alternatively be applied to an automatic transmission which has a different number of reduction gears. Further, the direct-coupling mechanism is not limited to the one described hereinbefore, wherein the coupling force is determined by the difference between the operating oil pressure and the internal pressure of the torque converter. Alternatively, the invention may be applied even to a conventional type direct-coupling mechanism wherein the locking-up of the torque converter is achieved by changing the direction of flow of oil circulating within the torque converter. To realize the invention with this type direct-coupling mechanism, it may be so arranged, for instance, that the operating oil pressure supplied through the fluid line 99 from the idle release valve 82 of the first embodiment shown in FIG. 3, is supplied as a pilot fluid pressure to a shift valve which controls the flow direction of oil circulating in the torque converter.

Still further, as the aforementioned first parameter signal representative of the engine load, may be employed in place of the throttle pressure a signal indicative of the vacuum pressure in the intake manifold of the engine or a signal indicative of the throttle valve opening which may both be electrically detected.

What is claimed is:

1. In a transmission for an automotive vehicle, of the type including a hydraulic power transmission means having an input member coupled to an internal combustion engine of said vehicle having an intake system and a throttle valve arranged in said intake system, an output member, and a direct-coupling mechanism arranged between said input and output members and operable to mechanically engage said input and output members with each other, a control system for controlling said direct-coupling mechanism, comprising:

first sensor means for detecting a value of the valve opening of said throttle valve;

control means adapted to compare the value of the valve opening of said throttle valve detected by said first sensor means with a predetermined reference value which increases from a value corresponding to a minimum opening of said throttle valve with increase of the speed of said vehicle, and cause said input and output members to engage with each other if the detected value of said valve opening is larger than said predetermined reference value, and cause then to disengage from each other if the detected value of said valve opening is smaller than said predetermined reference value:

second sensor means for detecting a value of the speed of said vehicle; and reference value setting means for setting said predetermined reference value to a larger value, as the detected value of the speed of said vehicle becomes larger.

2. A control system as claimed in claim 1, including an operating fluid source, and wherein said direct-coupling mechanism has a hydraulically operating portion operable in response to the pressure of operating fluid from said operating fluid source to mechanically engage said input and output members with each other.

3. A control system as claimed in claim 2, wherein said control means comprises a selector valve arranged in an operating fluid line connecting said hydraulically operating portion of said direct-coupling mechanism to said operating fluid source, for selectively permitting and interrupting the supply of the operating fluid pressure from said operating fluid source to said hydraulically operating portion.

4. A control system as claimed in claim 3, wherein said selector valve includes a valve body shiftable to assume a first position and a second position for, respectively, permitting and interrupting the supply of the operating fluid pressure from said operating fluid source to said hydraulically operating portion.

5. A control system as claimed in claim 4, wherein said first sensor means is adapted to generate a pilot fluid pressure corresponding to the detected valve opening of said throttle valve and supply same to said control means, said selector valve being disposed to have said valve body thereof shifted to said first position when the pilot fluid pressure supplied from said first sensor means exceeds said predetermined reference value.

6. A control system as claimed in claim 5, wherein said second sensor means is adapted to generate a pilot fluid pressure proportional to the speed of said vehicle as the detected value of said vehicle speed and supply same to said reference value setting means, said reference value setting means being adapted to set said predetermined reference value to a value dependent on the pilot fluid pressure supplied from said second sensor means.

7. A control system as claimed in claim 1, including a selector valve having spring means and being capable of selecting between a first position for engaging said input and output members with each other and a second position for disengaging said input and output members from each other, said selector valve being disposed to be urged toward said first position by fluid pressure corresponding to said throttle valve opening value, and to be urged toward said second position by the combined force of said spring means and the fluid pressure corresponding to said vehicle speed value.

8. A control system as claimed in claim 7, including:

an electromagnetic valve capable of selectively assuming a valve opening position wherein the fluid pressure corresponding to said throttle valve opening value and acting on said selector valve is allowed to drain to a lower pressure zone, and a valve closing position, and an electronic control circuit disposed to cause said electromagnetic valve to assume said valve opening position when the speed ratio between said input and output members exceeds a predetermined value.

9. A control system as claimed in claim 1, including:

a selector valve having spring means and being capable of selecting between a first position for engaging said input and output members with each other and a second position for disengaging said input and output members from each other, said selector valve being disposed to be urged toward said first position by fluid pressure corresponding to said throttle valve opening value and to be urged toward said second position by the force of said spring means when said fluid pressure is supplied to a lower pressure zone;

an electromagnetic valve capable of selectively assuming a valve opening position wherein said fluid pressure is allowed to drain to said lower pressure zone, and a valve closing position; and an electronic control circuit disposed to cause said electromagnetic valve to selectively assume either said valve opening position or said valve closing position in dependence upon the detected throttle valve opening value and the detected vehicle speed value.

10. A control system as claimed in claim 9, wherein said engine is contolled by a throttle valve, and said electronic control circuit includes:
- means for prestoring a plurality of throttle valve opening reference values;
- means for selecting references values stored in said prestoring means, in such a manner that progressively larger reference values are selected as the vehicle speed increases;
- means for detecting the vehicle speed as said vehicle speed value;
- means operatively associated with said selecting means and said detecting means for reading that particular one of said throttle valve opening reference values which corresponds to the detected vehicle speed;
- means for detecting the throttle valve opening of said throttle valve, and said throttle valve opening value;
- means for comparing the detected valve opening value with said particular one of said throttle valve opening reference values; and
- means for causing said electromagnetic valve to assume said valve opening position thereof when the throttle valve opening is smaller than said particular one of said throttle valve opening reference values.

* * * * *